(12) United States Patent
Ponnathpur et al.

(10) Patent No.: US 8,888,017 B2
(45) Date of Patent: Nov. 18, 2014

(54) SYSTEM, METHOD, AND APPARATUS FOR DELIVERING HIGHLY ATOMIZED DIESEL EXHAUST FLUID TO AN EXHAUST AFTERTREATMENT SYSTEM

(75) Inventors: Chetan Ponnathpur, Columbus, IN (US); Stephanie L. Apewokin, Columbus, IN (US); Steve Holl, Columbus, IN (US); Jim F. Burke, Columbus, IN (US); John Heichelbech, Columbus, IN (US); Andrew Myer, Greenwood, IN (US); Melissa A. Zaczek, Greenwood, IN (US); Yongquan Chai, Columbus, IN (US); Eric Burmeister, Happy Valley, OR (US); Nate Garrett, Columbus, IN (US)

(73) Assignee: Cummins Inc., Columbus, IN (US)

( * ) Notice: Subject to any disclaimer, the term of this patent is extended or adjusted under 35 U.S.C. 154(b) by 466 days.

(21) Appl. No.: 13/243,096

(22) Filed: Sep. 23, 2011

(65) Prior Publication Data
US 2012/0160934 A1    Jun. 28, 2012

Related U.S. Application Data

(60) Provisional application No. 61/385,888, filed on Sep. 23, 2010.

(51) Int. Cl.
*B05B 15/00* (2006.01)
*F01N 3/32* (2006.01)
*F01N 3/20* (2006.01)

(52) U.S. Cl.
CPC ............. *F01N 3/2066* (2013.01); *F01N 3/32* (2013.01); *F01N 2610/08* (2013.01); *F01N 2610/1453* (2013.01); *F01N 2610/03* (2013.01); *Y02T 10/24* (2013.01); *F01N 2610/085* (2013.01)

USPC ............................................ 239/289; 239/433

(58) Field of Classification Search
CPC ...... B05B 7/04; B05B 7/0416; B05B 7/0458; B05B 7/0483
USPC .............. 239/398, 407, 433, 434, 424.5, 289; 123/429
See application file for complete search history.

(56) References Cited

U.S. PATENT DOCUMENTS

| 4,576,223 | A | 3/1986 | Humpolik et al. |
| 5,252,298 | A | 10/1993 | Jones |
| 7,188,789 | B2 * | 3/2007 | Schwegler et al. ........... 239/555 |
| 2005/0031514 | A1 | 2/2005 | Patchett et al. |
| 2008/0092531 | A1 | 4/2008 | Suzuki et al. |
| 2009/0031514 | A1 | 2/2009 | Good |
| 2011/0232267 | A1 * | 9/2011 | Bruck ............................ 60/274 |
| 2012/0103306 | A1 * | 5/2012 | Livshits et al. ............... 123/429 |

OTHER PUBLICATIONS

International Search Report and Written Opinion, PCT/US2011/053025, ISR/US, Cummins Inc., Feb. 8, 2012.
State Intellectual Property Office, P.R. China, First Office Action (English Translation), and Search Report, May 28, 2014, 6 pages, China.

* cited by examiner

*Primary Examiner* — Davis Hwu
(74) *Attorney, Agent, or Firm* — Krieg DeVault LLP

(57) ABSTRACT

A system includes a cylindrical blend chamber having two inlets and one outlet. The outlet is fluidly coupled to a transfer line, and a nozzle is positioned downstream of the transfer line. The nozzle is fluidly coupled to an exhaust stream of an internal combustion engine. The system further includes a first inlet fluidly coupled to a diesel exhaust fluid (DEF) stream, and a second inlet fluidly coupled to an air stream. The DEF stream and the air stream intersect at a divergent angle.

20 Claims, 11 Drawing Sheets

SYSTEM, METHOD, AND APPARATUS FOR DELIVERING HIGHLY ATOMIZED DIESEL EXHAUST FLUID TO AN EXHAUST AFTERTREATMENT SYSTEM

RELATED APPLICATIONS

This application is related to, and claims the benefit of, U.S. Provisional Application No. 61/385,888 entitled SYSTEM, METHOD, AND APPARATUS FOR DELIVERING HIGHLY ATOMIZED DIESEL EXHAUST FLUID TO AN EXHAUST AFTERTREATMENT SYSTEM filed on Sep. 23, 2010 which is incorporated herein by reference in the entirety for all purposes.

BACKGROUND

Emissions regulations in many areas of the world have introduced the need to utilize aftertreatment systems for internal combustion engines. An exemplary system uses a diesel exhaust fluid (DEF) such as a urea-water solution injected into the engine exhaust stream. In the presence of a properly selected catalyst, the DEF reacts with $NO_x$ in the exhaust stream, eliminating a portion of the $NO_x$ through reduction. The use of DEF is effective for reducing $NO_x$, but suffers from several drawbacks. The DEF can freeze in cold ambient environments, causing a long delay period after engine startup until the aftertreatment system is fully functioning to reduce emissions. The DEF fluid must be atomized in the exhaust fluid into very small droplets to support evaporation of the DEF, and to further support decomposition of urea into ammonia, where applicable. Certain systems to ensure atomization include air-assist devices in the DEF injection system. A properly designed air-assist device is effective in ensuring the DEF is fully atomized in the exhaust stream. However, contact between the air and the DEF, especially where fluid temperatures are low, can cause crystallization of components of the DEF on injectors, in flow tubes, or in other areas of the system that cause sub-optimal performance or system failure. Where crystallization of components of the DEF occurs, it can be a challenge to detect and treat the crystallization condition without performing a full service event.

SUMMARY

One embodiment is a unique apparatus for providing a highly atomized urea-water mixture to an aftertreatment system for an internal combustion engine. Further embodiments, forms, objects, features, advantages, aspects, and benefits shall become apparent from the following description and drawings.

DESCRIPTION OF THE ILLUSTRATIVE EMBODIMENTS

Figure 1:
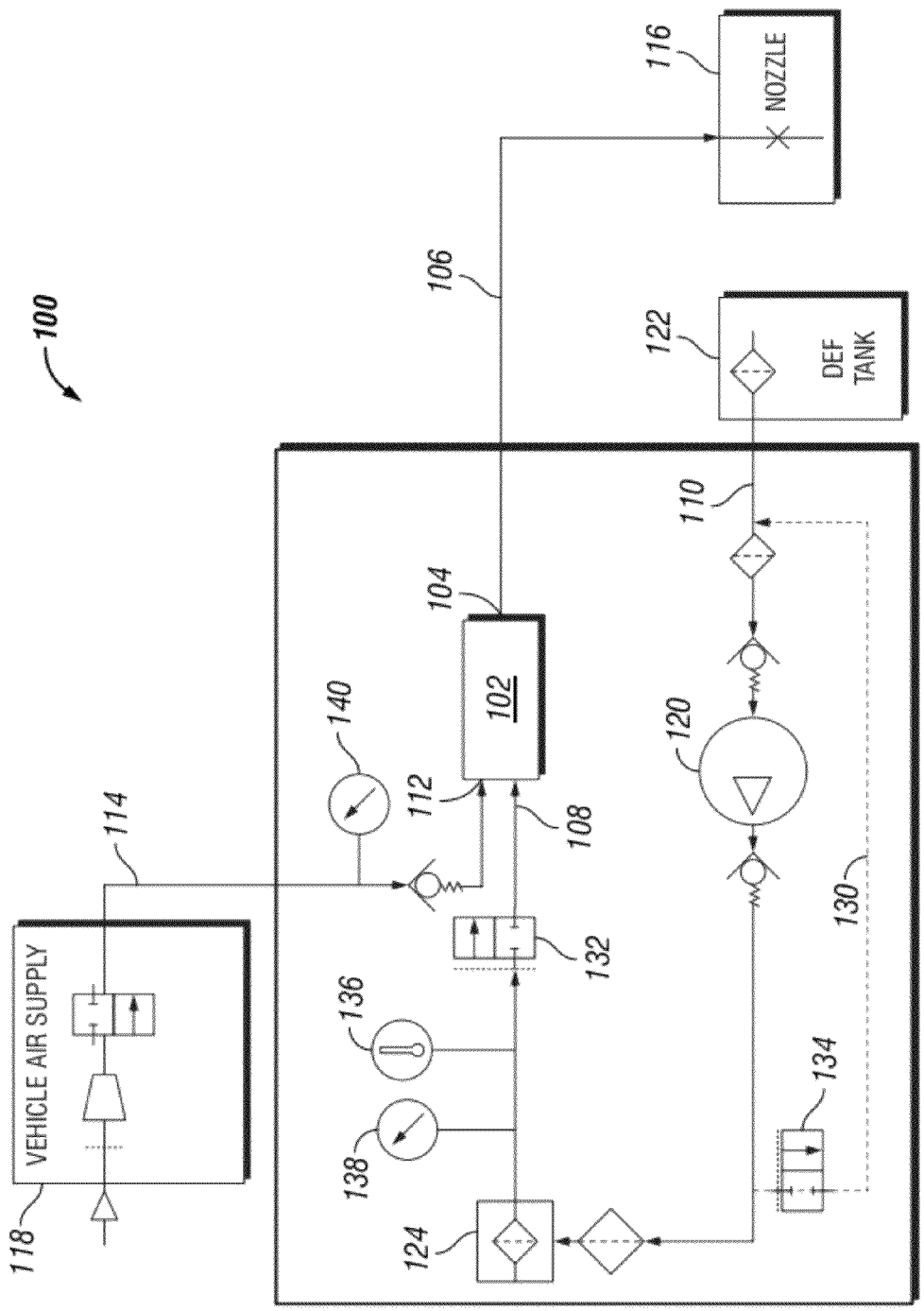
FIG. 1 is a schematic block diagram of an air assisted dosing system utilizing a vehicle air supply.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referencing FIG. 1, a system 100 includes a cylindrical blend chamber 102 having two inlets 108, 112 and one outlet 104. Cylindrical, as used herein, describes a chamber having an elongated cross-sectional shape. An exemplary cylindrical blend chamber is a circular cylindrical blend chamber, although other cross-sectional shapes or combinations of cross-sectional shapes are contemplated herein.

The outlet 104 is fluidly coupled to a transfer line 106. The system 100 further includes a nozzle 116 downstream of the transfer line 106. The nozzle 116 is fluidly coupled to an exhaust stream of an internal combustion engine (not shown). The nozzle 116 in FIG. 1 is illustrated schematically. Referencing FIG. 9, an exemplary nozzle 116 is shown having injection holes 902. A mixed fluid stream of diesel exhaust fluid (DEF) and air (or other support gas) is received from the transfer line 106 and injected into the exhaust stream through holes 902. The description herein including DEF is directed to any urea-containing fluid, whether utilized in relation to a diesel engine or to any other treatment system using a urea-water fluid mixture.

Returning to FIG. 1, a first one of the inlets 108 is fluidly coupled to a DEF stream 110. In the example of FIG. 1, the DEF stream 110 is introduced to the system 100 from a DEF tank 122, which may include a screen or other devices, and provided to the blending chamber 102 by a pump 120. An exemplary pump 120 is a diaphragm pump, although any type of pump 120 that is compatible with DEF is contemplated herein.

Figure 3:
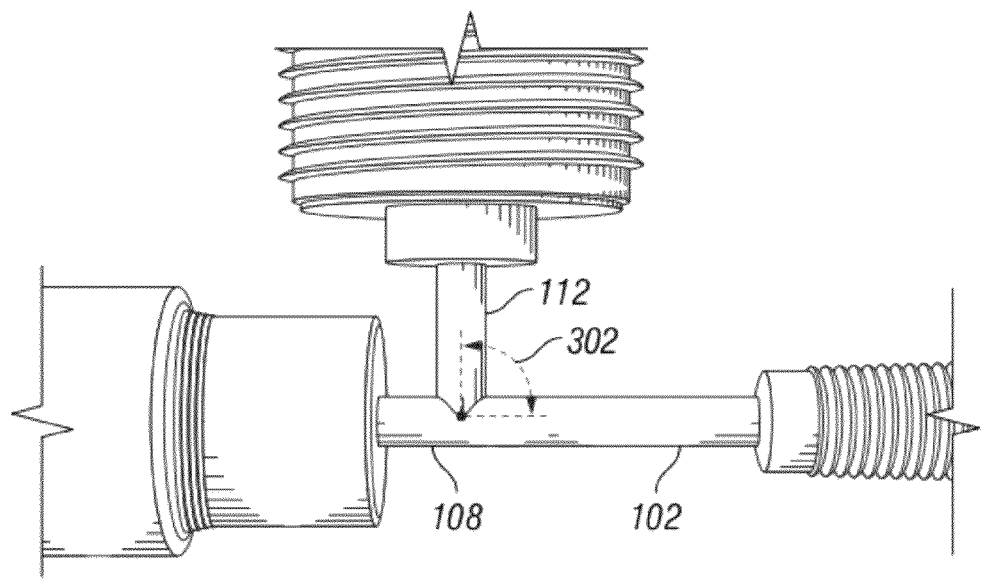
FIG. 3 depicts an exemplary blend chamber.

The second inlet 112 is fluidly coupled to an air stream 114. The DEF stream 110 and the air stream 114 intersect at a divergent angle. An exemplary divergent angle is a perpendicular angle (i.e. 90° or a substantially similar angle). Other steep angles that still provide sufficient atomization are contemplated herein. Referencing FIG. 3, a close-up of an exemplary blending chamber 102 is illustrated. The second inlet 112 receiving the air stream and the first inlet 108 receiving the DEF stream have centerlines separated by an angle 302 that is a divergent angle. In the example of FIG. 3, the divergent angle is a perpendicular angle. The DEF stream is in line with the blending chamber 102, while the air stream is perpendicular to the blending chamber 102.

In certain further embodiments the system 100 includes the air stream 114 terminating at the cylindrical blend chamber 102 in an orifice having a length of at least 5 mm. Referencing FIG. 4, an orifice 402 is positioned at the second inlet 112. The orifice 402 is provided to be at least 5 mm long. In certain embodiments, the orifice 402 has a diameter sized to provide a desired air flow velocity at a designed air flow rate. An exemplary system 100 includes an air source capable of providing sufficient air flow to the air stream such that an air velocity of the air stream in the orifice 402 is at least 47 m/sec.

In certain embodiments, the system 100 includes a non-return valve disposed in the air stream at a position upstream of the orifice. Additionally or alternatively, the air source may be a vehicle air supply 118, or a dedicated air pump. Referencing FIG. 2, a stand alone air supply 202 includes an air pump that provides dedicated air to the system 100 for the air stream 114.

Figure 8:
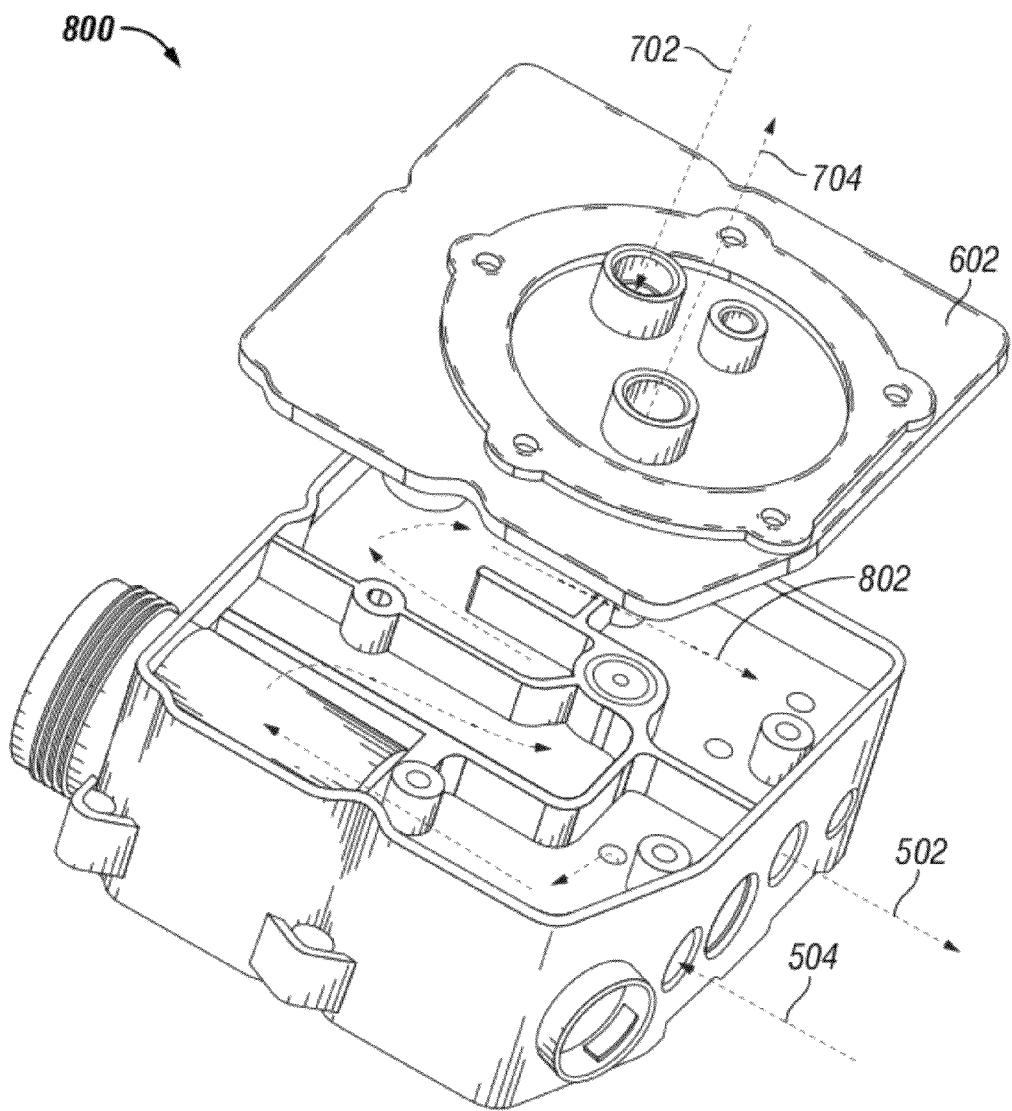
FIG. 8 depicts another view of a packaging example with the bottom cover shown separated, and illustrating a coolant flow path.

An exemplary system 100 further includes a coolant cavity thermally coupled to the DEF stream 110. The coolant cavity may be structured receive engine coolant. In certain embodiments, the coolant cavity is formed by a housing wall coupled to a dosing module. Referencing FIG. 8, a bottom cover 602 (housing wall) couples to a dosing module 800 forming a cavity for a coolant flow path 802 therein. The coupling mechanism of the bottom cover 602 includes fasteners, a vibration weld, or an ultrasonic weld. The use of a weld eliminates the need for elastomeric seals or gaskets, and provides for a leak-free coolant chamber that is resistant to vibration and aging. The coolant follows a first coolant inlet 504 and first coolant outlet 502, or follows a second coolant inlet 702 and second coolant outlet 704. The multiple coolant inlet and outlets provide for a number of installation options. Coolant inlets and outlets that are not in use may be sealed or not present.

In certain embodiments, the system 100 includes a bypass line 130 that may serve any or all of several functions. The bypass line 130 may prevent pump 120 overpressurization, provide a heating mechanism (e.g. a heater on the bypass line 130 heats the DEF stream 110 as the bypass line 130 recirculates), and/or the bypass line 130 provides fluid movement improving heat transfer from a coolant chamber to the DEF stream 110 (reference FIG. 8).

Further embodiments of systems contemplated herein are described following. Referencing FIG. 1, a schematic diagram of a system 100 for delivering DEF to an exhaust stream of an internal combustion engine is shown. The system 100 includes an air source 118. In the example of FIG. 1, the air source 118 is a vehicle air supply 118, such as an on-board air compressor tank or other supply. The air source 118 includes a pressure regulator, a particle screen and/or basket, and a normally-closed shutoff valve.

Further in FIG. 1, a dosing module is disposed within a housing, the dosing module having an air stream 114 and a DEF stream 110. The air stream 114 passes through a non-return valve (e.g. a check valve) and meets the DEF stream 110 at a 90-degree angle, or at a substantially 90-degree angle. In certain embodiments, the angle of intersection between the DEF stream and the air stream may vary. The dosing module includes a cylindrical blend chamber 102. The use of a cylindrical blend chamber 102 reduces the residence time of the mixing fluids in the blend chamber 102 relative to a bell-shaped or otherwise expanded mixing chamber. The reduced residence time reduces the chance that localized portions of the DEF will dry and form crystals of an active DEF component such as urea or partially reacted urea components. The cylindrical blend chamber 102 also reduces or eliminates any eddy streams or recirculation within the blend chamber, which are also known to cause crystallization of active DEF components within the blend chamber 102.

The dosing module further includes the DEF stream 110. The DEF stream 110 receives the DEF from a DEF tank 122, which includes a particle filter. The dosing module further includes an additional screen on the DEF intake, and a non-return valve disposed in the DEF stream before a dosing pump 120. The dosing pump 120 in the illustration is a diaphragm pump, but may be any type of pump that is compatible with the DEF fluid at the temperatures present in the dosing module. The dosing module may include a non-return pump (not shown) downstream of the pump 120. In certain embodiments, the dosing module further includes a pulsation dampener 124 in-line with the DEF stream 110, and a fine filter 132 (10 micron in the example). The dosing module further includes a metering valve (not shown) that provides pressurized DEF to the blend chamber 102.

The example of FIG. 1 includes a pressure sensor 140 on the air stream 114, which may be used in feedback control of the air pressure and/or which may be used to determine the required DEF stream pressure and/or flow rate to achieve the desired DEF flow rate in the transfer line 106. The example of FIG. 1 further includes a pressure sensor 138 and/or a temperature sensor 136 on the DEF stream 110. The pressure sensor 138 and/or temperature sensor 136 on the DEF stream 110 may be used for diagnostics, to control the DEF pump 120, to control the metering valve, or for any other purpose understood in the art. The dosing module may further include a urea quality sensor (not shown). The specific sensors illustrated and described are optional, and may be relocated or excluded.

The blending chamber 102 supplies mixed air and DEF to a downstream nozzle 116. The nozzle 116 is fluidly coupled to an exhaust stream of an internal combustion engine at a position upstream of where the DEF is utilized in the exhaust stream. An exemplary system includes a selective catalytic reduction (SCR) element that reduces an amount of $NO_x$ in the exhaust stream in the presence of the DEF. The mixed air and DEF exiting the nozzle comprises an atomized DEF stream.

A bypass line 130 to the DEF inlet is shown in FIG. 1. The bypass line 130 includes a normally-closed bypass valve that is controllable by a controller and/or by a pressure threshold. The bypass line 130 allows for heating of the bypass stream to warm the entire DEF stream 110. Alternatively or additionally, the bypass line 130 allows the DEF pump 120 to operate at higher than a demanded rate, thereby maintaining pressure in the DEF stream 110 for transient operations. The heating of the bypass line 130 is accomplished by thermal exposure of the bypass line 130 to a warmer stream, for example engine coolant in a chamber positioned in thermal contact with the bypass line 130. In certain embodiments, an electrically resistive element in positioned in thermal contact with the bypass line 130 and selectively warms the bypass line 130.

Figure 2:
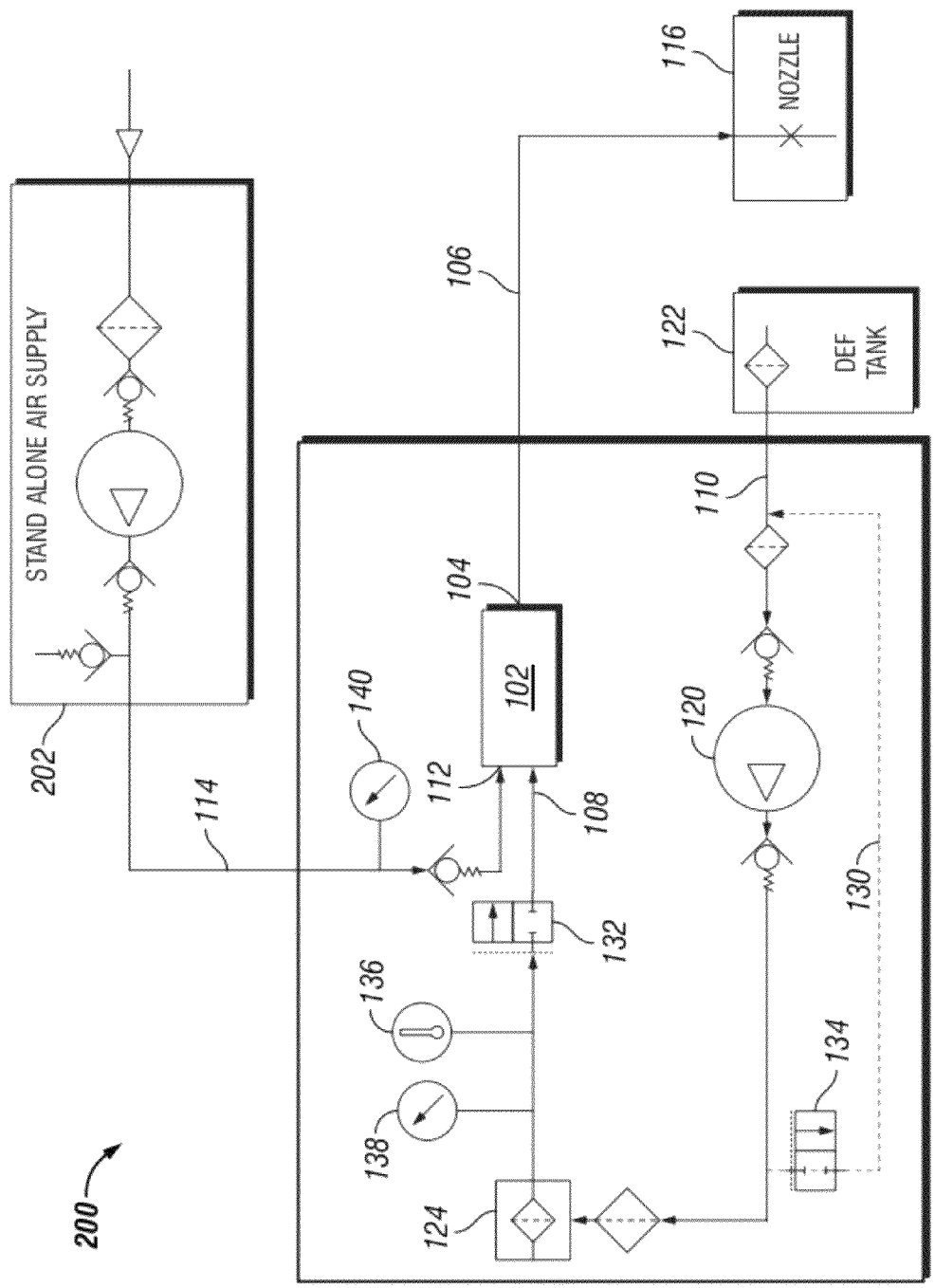
FIG. 2 is a schematic block diagram of an air assisted dosing system utilizing an independent air supply.

Referencing FIG. 2, a schematic diagram of a similar system 200 to that illustrated in FIG. 1 is shown. The system 200 of FIG. 2 includes a stand alone air supply 202, which may include a dedicated air pump. The air supply 202 includes an air inlet, a particle filter, and an air pump of any type understood in the art. The air source further includes a non-return valve disposed on each side of the air pump. In one example, the air source pressure is controlled by a controller utilizing the pressure pump on the dosing module, where the controller operates the pump to maintain a specified pressure and/or to ensure the air source does not exceed a specified pressure.

Alternatively or additionally, the air source pressure may be controlled by continuously sending air through the air stream, blend chamber, and nozzle. Further, the air source includes an air pressure relief valve that may be utilized to control the air pressure or to merely limit the air pressure to a maximum value. Exemplary air sources are illustrated in FIG. 1 and FIG. 2, but any air source known in the art or available on a particular vehicle is contemplated herein.

An illustration of a blend chamber 102 is shown in FIG. 3. The blend chamber is cylindrical and exits to the right in FIG. 3. The DEF feeds from the left, and the air feeds from the top. The air stream intersects the DEF stream at a 90-degree angle. The blend chamber 102 in FIG. 2 is a plastic blend chamber 102, but the blend chamber 102 may be any material that is inert to the DEF stream at the temperatures in the dosing module, and further that is compatible with the temperature and vibration environment of the dosing module.

The DEF stream entrance in FIG. 3 includes spacing for a doubly redundant seal. The seal includes a radial O-ring and a face sealed O-ring, and further includes a second set of O-rings. Any DEF leakage within the dosing module may cause crystallization of the urea or other DEF components within the dosing module, including within the DEF stream and/or the air stream. Any crystallization within the dosing module may introduce sub-optimal performance or failure. Mixing of the air stream and DEF stream outside of the blend chamber can cause cooling and drying of the urea or other DEF components, also causing crystallization. In certain embodiments, each internal tubing connection within the dosing module includes a radial O-ring and a face sealing O-ring. Additionally, certain embodiments include doubly-redundant sealing on certain internal tubing connections, on internal tubing connections for the DEF stream 110, and/or for all internal tubing connections.

Figure 4:
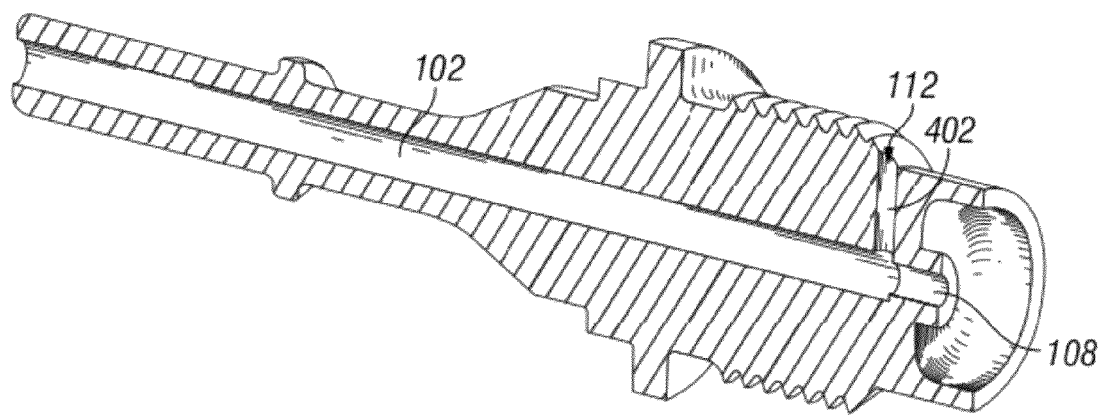
FIG. 4 depicts a cutaway view of another exemplary blend chamber.

Referencing FIG. 4, an exemplary blend chamber is shown. The blend chamber includes an air inlet orifice 402 at the top. The air inlet orifice is 1.5 mm in diameter, and 5.5 mm in length. In certain embodiments, it has been shown to be beneficial for the air stream outlet and the mixing point of the DEF to be separated by about 6 mm to prevent droplets of the DEF from entering the air stream and forming crystals. The 6 mm may be formed from the length of the orifice, as shown, and from the geometry of the non-return valve in the air stream providing some additional length to the flow path from the air stream outlet and the mixing point of the DEF. Further, the air inlet orifice and air flow rate cooperate to provide a minimum linear velocity of air between the air stream outlet and the mixing point of the DEF. In certain embodiments, the minimum linear velocity is about 47 meters per second. In the illustration of FIG. 4, the DEF enters from the right side of FIG. 3, mixes with the air, and passes through the cylindrical blend chamber before exiting to the transfer line (not shown) at the left. The cavity at the DEF side is to accommodate seals at the connection of the DEF stream, and is not exposed to fluid during operations of the dosing module.

Figure 5:
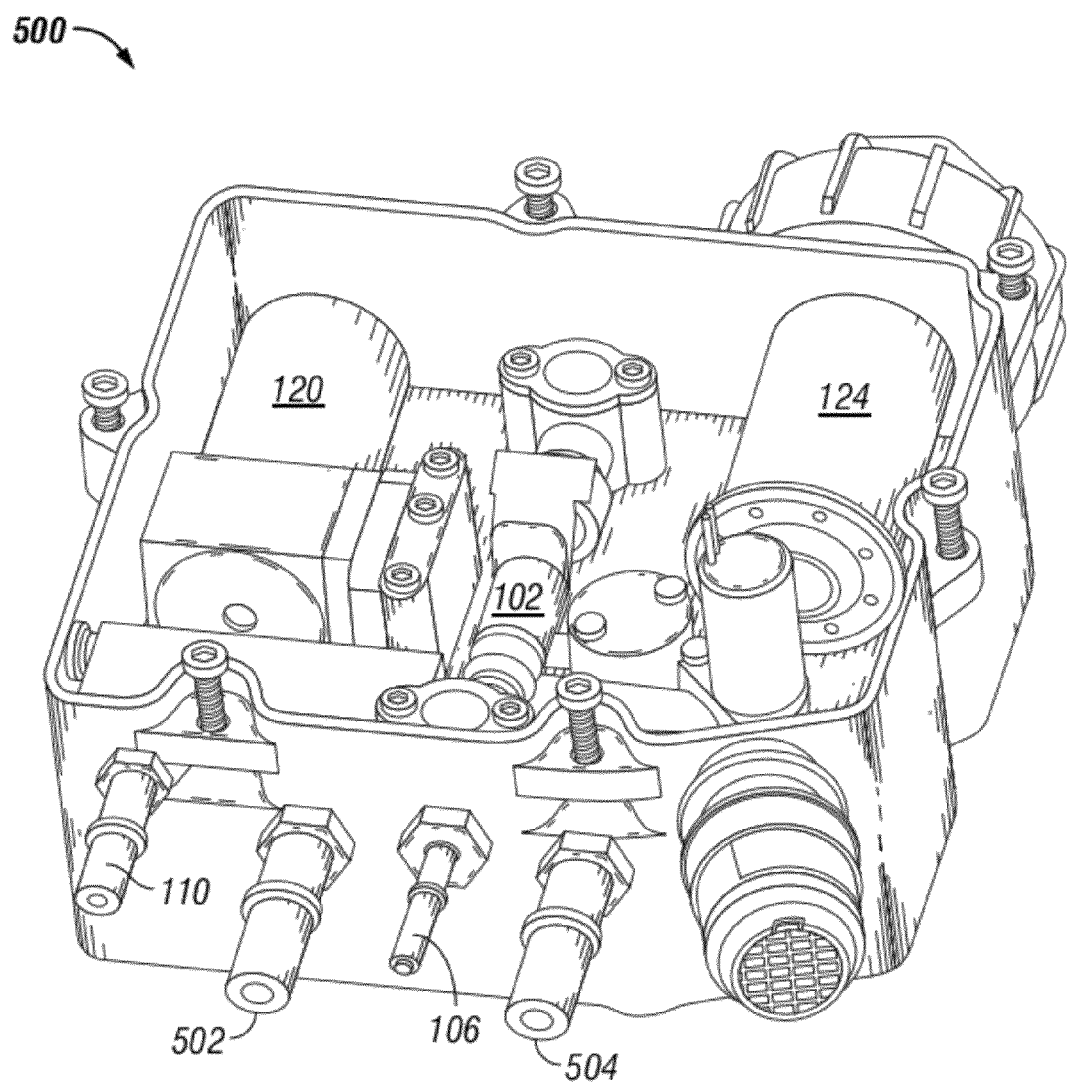
FIG. 5 depicts a packaging example of a dosing module with a top cover removed.
Figure 6:
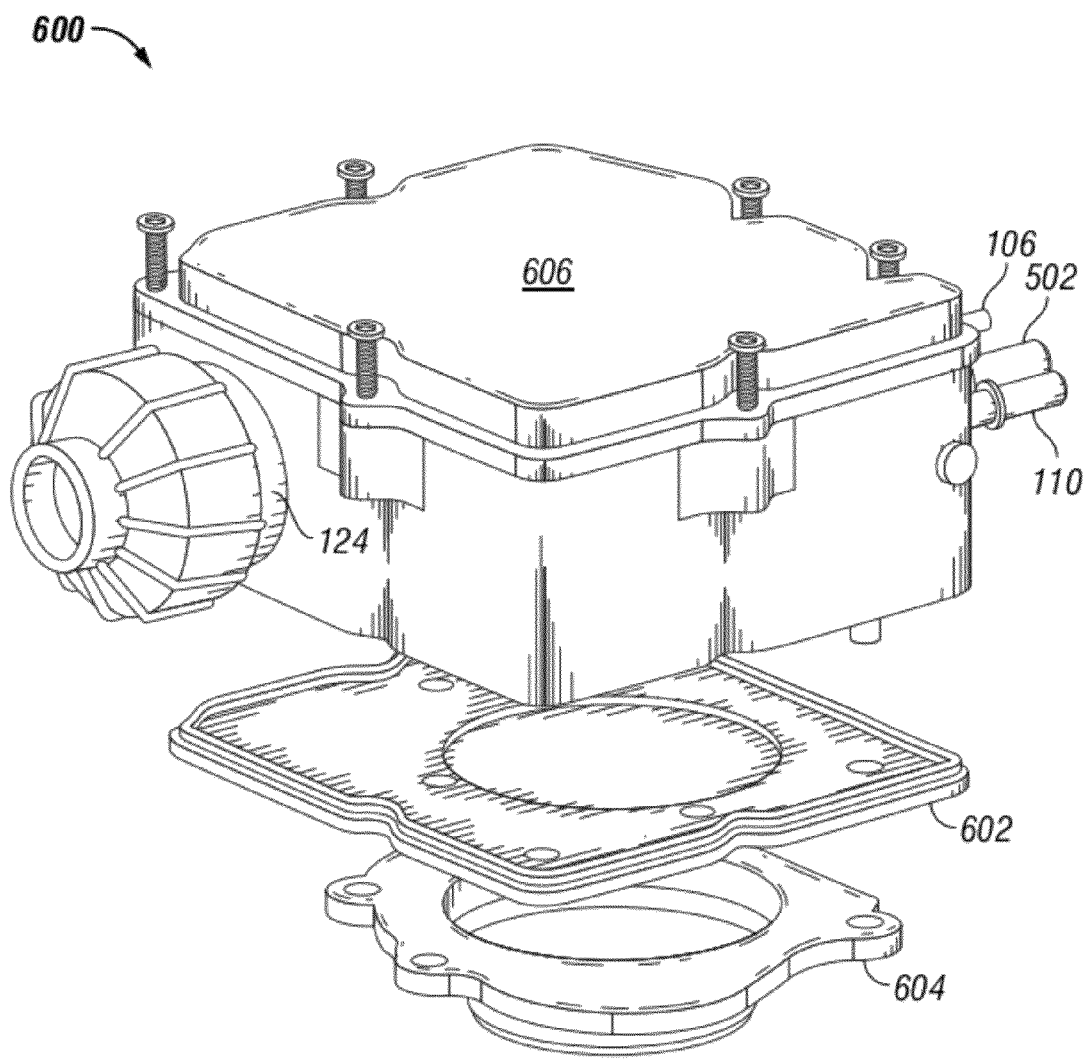
FIG. 6 depicts another view of a packaging example of a dosing module with a bottom cover shown separated.

Referencing FIG. 5, a packaging example 500 of the dosing module is illustrated. The positioning of large parts such as the pump 120, the blending chamber 102, and the pulsation dampener 124 are illustrative and non-limiting. A coolant inlet 504 and coolant outlet 502 are provided. A DEF stream 110 inlet is on the left, and the transfer line 106 connection is in the center. The air inlet is provided at the top of the dosing module in the example of FIG. 5. In certain embodiments, all internal tubing connections in the dosing module include radial and face-sealing O-rings, and certain connections are doubly redundant to prevent fluid leakage. Referencing FIG. 6, another view 600 of the exemplary packaging sample is provided. A top cover 606 includes a gasket seal and is removable for service or maintenance. A bottom cover 602 is shown separated from the dosing module. In certain embodiments, the bottom cover 602 is permanently affixed, and defines a chamber for thermal exposure of the engine coolant, or other heating mechanism, to the DEF stream 110. The bottom cover 602 may be ultrasonically or vibrationally welded to the dosing module, although other methods for attaching the cover are known in the art. The bottom cover 602 may fully seal the bottom of the dosing module, or may be couplable to an adapter 604 for mounting or other connection purposes.

Figure 7A:
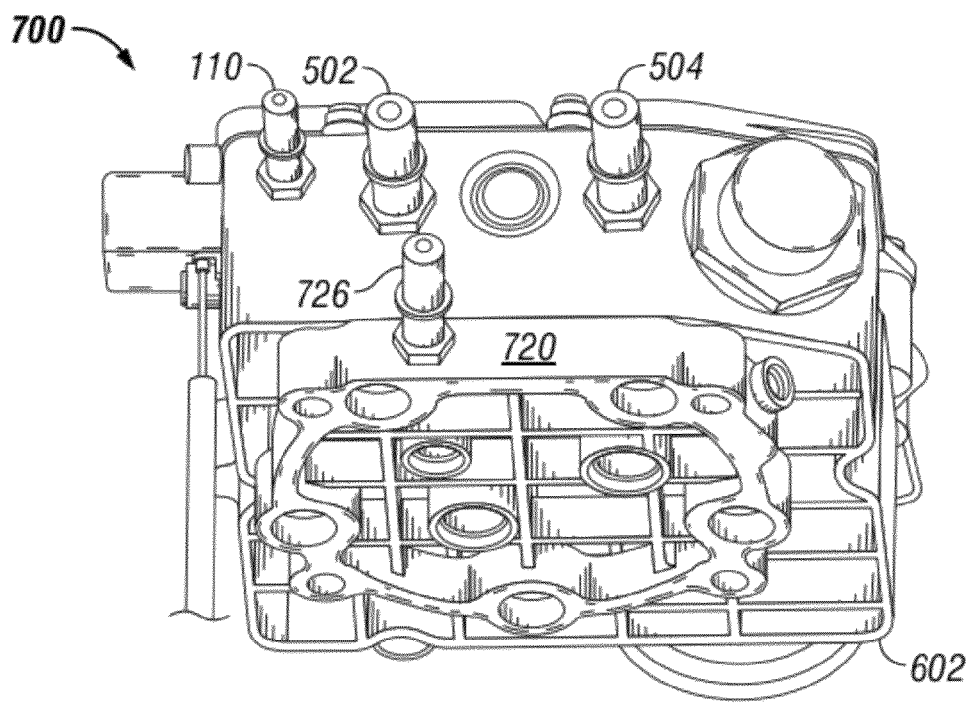
FIG. 7A depicts a housing for a dosing module.
Figure 7B:
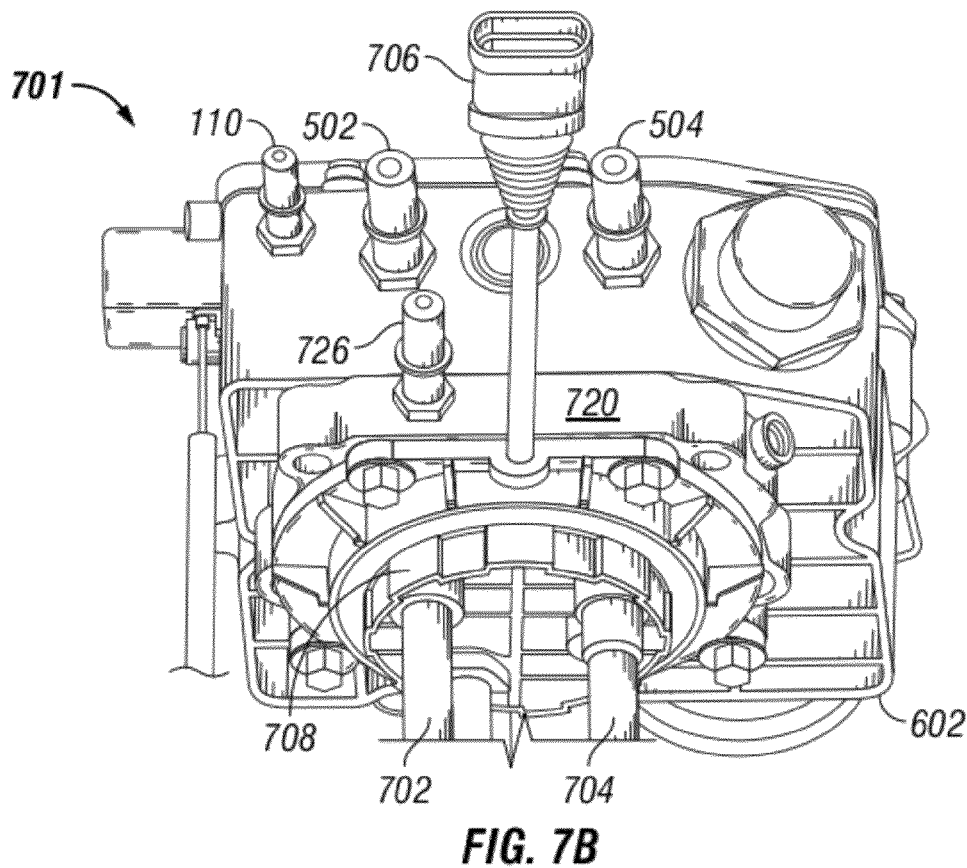
FIG. 7B depicts a housing for a dosing module engaged with a mounting head.

Referencing FIG. 7A, an exemplary dosing module 700 dosing module is illustrated in a bare configuration for direct mounting in an application. The dosing module includes an adapter 720 having receiving holes at the bottom to accept mounting bolts. The dosing module on the right is engaged with a mounting head. Referencing FIG. 7B, a dosing module 701 is attached to a mounting head 708, which accepts an alternate connection for a coolant inlet 702 and coolant outlet 704. The dosing modules 700, 701 use an alternate position 726 for the transfer line connection, although any position on the dosing module is contemplated herein. The embodiment of FIG. 7B illustrated a connector 706 for providing power and/or communications to the dosing module 701.

Figure 9:
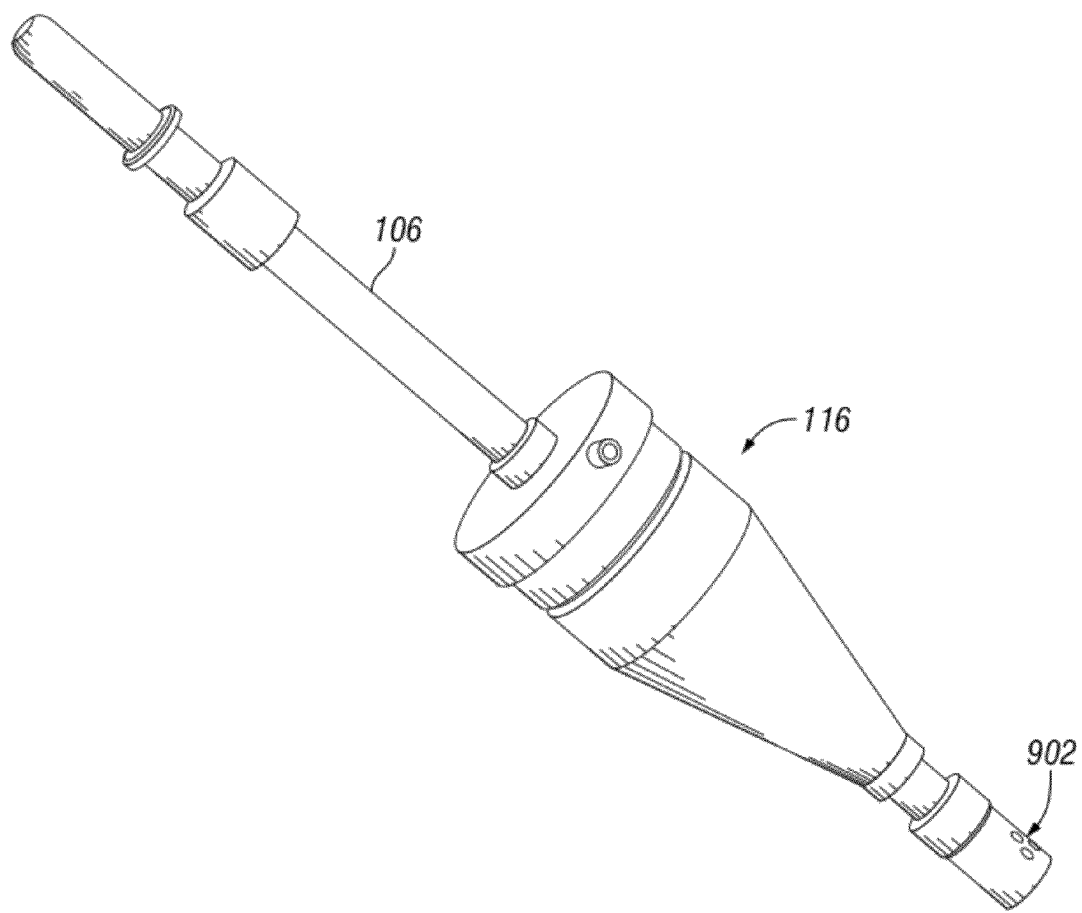
FIG. 9 depicts an exemplary nozzle for exhaust fluid injection.

Referencing FIG. 9, an exemplary nozzle 116 is shown. The nozzle 116 is disposed into the exhaust stream of the engine, and receives the DEF-air mixture from the dosing module. The injection holes 902 are at the end of the nozzle 116, and in certain embodiments they are presented on the side of the nozzle 116. The side location of the injection holes 902 allows the DEF to be injected axially into the exhaust stream, rather than radially as is normal for a side-mounted injector. Where the nozzle 116 is selectively sized and positioned, the DEF is further injected at or near the centerline of the exhaust stream.

Figure 10:
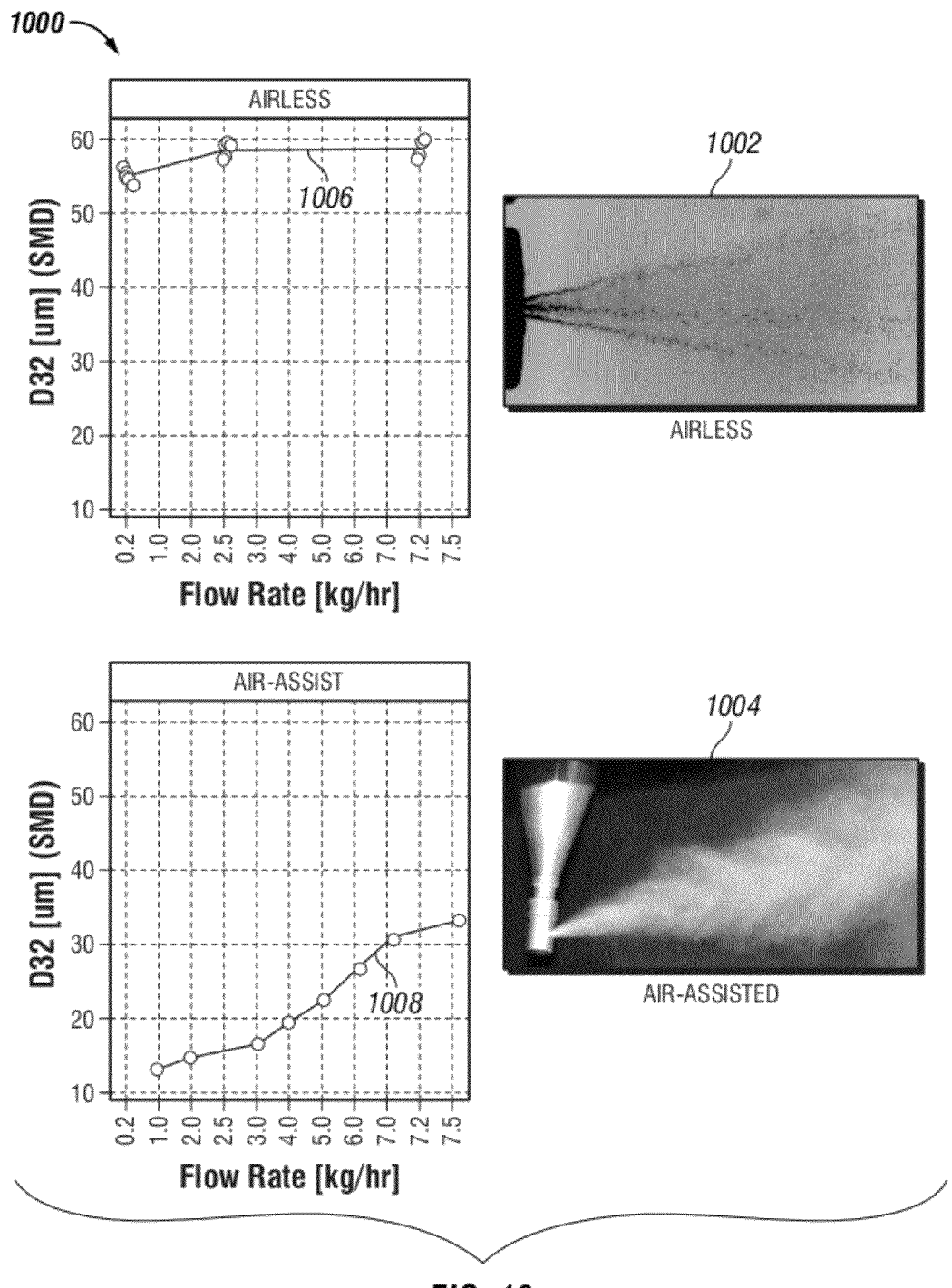
FIG. 10 depicts a comparison between an exemplary doser and a prior art doser.

Referencing FIG. 10, an injector using a DEF-only fluid includes results illustrated in the "airless" diagram 1006. An injector using a DEF-air mixture includes results illustrated in the "air-assisted" diagram 1008. The air-assisted provides a qualitatively superior injection by observing the photographed injection pictures 1002, 1004. Referencing the quantitative data, it is seen that the air-assisted injection is more sensitive to the injection rate, for example the curve 1006 rises rapidly above a flow rate of about 4.0 kg/hr. Nevertheless, the air-assisted injection provides far smaller droplet sizes throughout the range of flow rates tested. Smaller droplet sizes improve the heat transfer into droplets, the evaporation rate of droplets, reducing formation of crystals or side reactions, and reducing time lag between injection of the reductant (e.g. urea) and availability of the reductant at the SCR catalyst or other target component. Because SCR systems provide real-time delivery of reductant, i.e. reductant is being injected to meet the present $NO_x$ reduction needs, the time lag between injection and availability is important to avoid wasting DEF, to meet $NO_x$ emissions targets, and to avoid undesirable circumstances such as ammonia slip from the SCR component.

Figure 11:
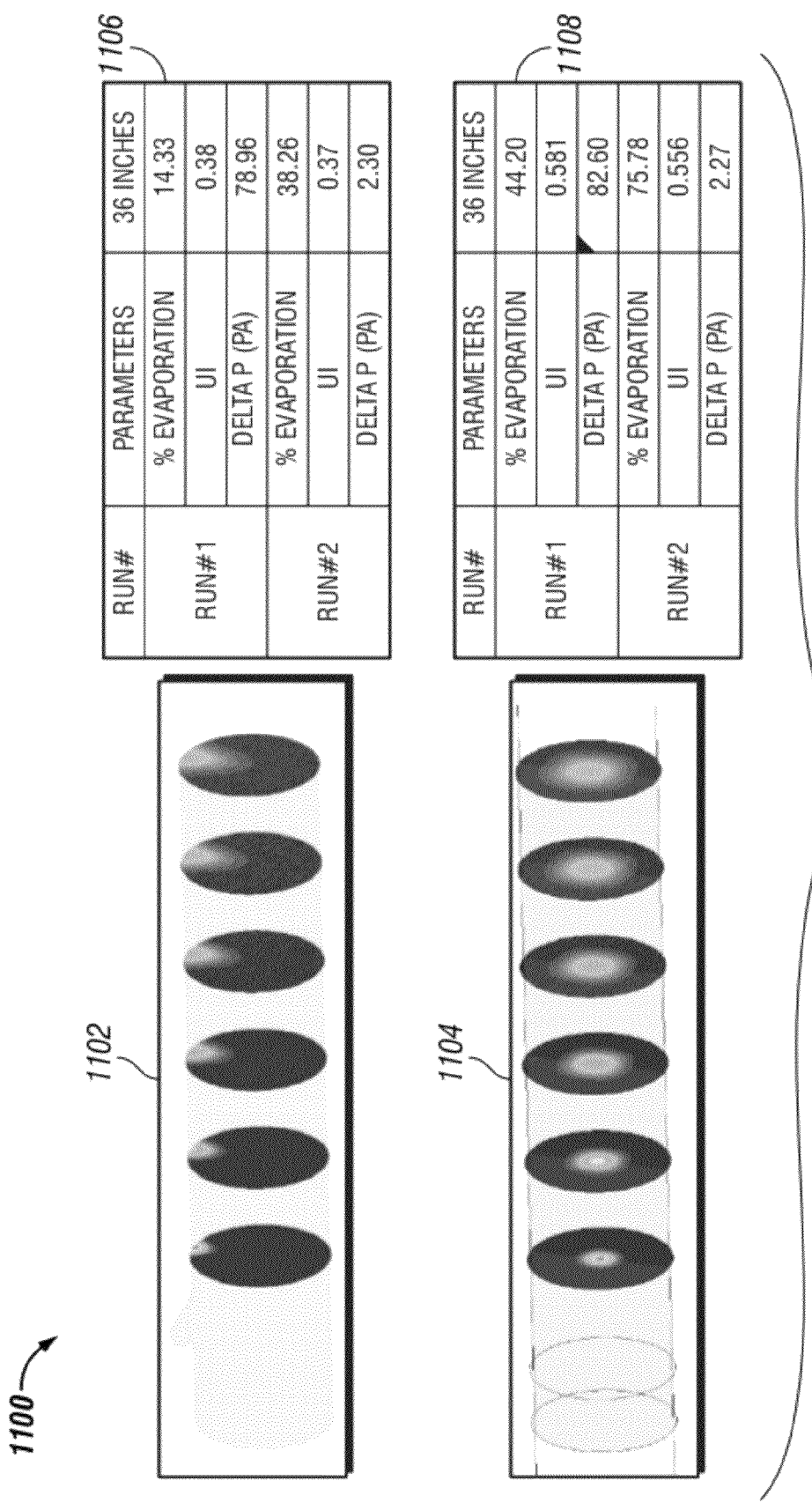
FIG. 11 illustrates comparative simulation data for a boss mounted doser and a centerline mounted doser.

Referencing FIG. 11, some flow results 1100 of a side mounted (i.e boss-mounted, radial delivery) injector and a centerline injector are shown. The Run #1 is at a first flow rate (e.g. as indicated by the $\Delta P$ difference between Run #1 and Run #2) and the Run #2 is at a second flow rate. Comparing in the data 1106, 1108 the Run #1 between the two configurations, it is apparent that centerline injection provides improved evaporation and uniformity (UI is the uniformity index) in the radial direction. Comparing Run #2 at the low flow rates, greater evaporation and uniformity is again observed for the centerline injection. The figures 1102, 1108 provide a visual representation of DEF distribution downstream of a DEF injector over the 36 inches downstream of the injector. It is qualitatively apparent from the visual representations 1102, 1104 that the centerline injection provides for an improved distribution uniformity.

Figure 12:
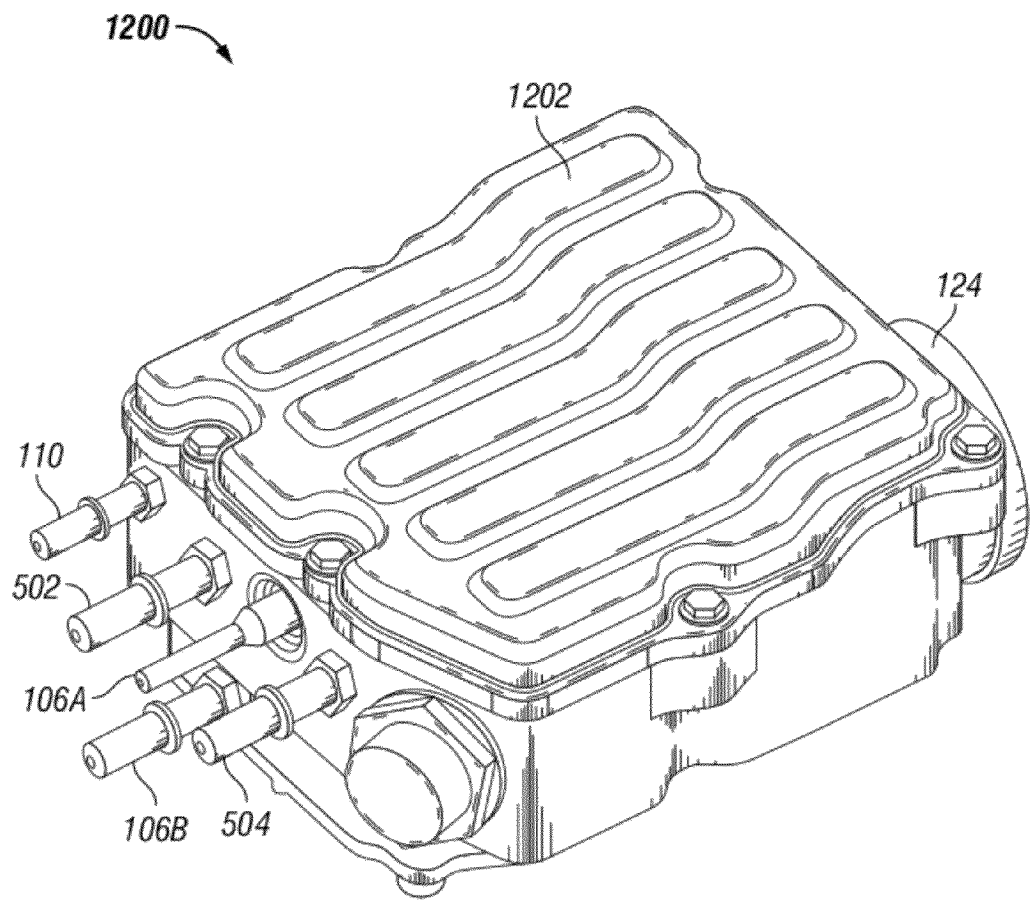
FIG. 12 depicts an assembled exemplary dosing module package.

Referencing FIG. 12, a packaging example with the top cover 1202 in position is illustrated. The alternative transfer line connections 106A, 106B are shown in FIG. 12. In a particular embodiment, only one of the transfer line connections 106A, 106B will be present. The top cover 1202 is removable in the exemplary embodiment, allowing access to the internal components of the dosing module for service or maintenance.

An exemplary procedure is described to periodically clean the blend chamber. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

An exemplary procedure includes determining a cleaning cycle index and, in response to the cleaning cycle index exceeding a threshold cleaning value, provide a cleaning procedure command. The cleaning cycle index may be a time since a previous cleaning cycle operation, a Δ-pressure value of the cylindrical blend chamber, an occurrence of a cleaning cycle triggering event, and/or an accumulating parameter value since a previous cleaning cycle operation.

A cleaning cycle triggering event includes a loss of air from the air source (e.g. the air pump fails or is interrupted for a period of time), a temperature excursion within the cylindrical blend chamber below a threshold temperature, and/or a service input request. In a further embodiment, the exemplary procedure includes determining that a temperature of the exhaust stream of the engine is above a threshold value before proceeding with cleaning operations. Where the temperature of the exhaust stream of the engine is too low, the cleaning procedure may be held and performed as soon as the exhaust temperature reaches the threshold, with or without checking the cleaning cycle index. An exemplary exhaust temperature threshold is 300° C.

Exemplary accumulating parameters include vehicle miles driven, engine operating time, engine $NO_x$ produced, engine fuel consumed, and an amount of DEF fluid injected. Any parameter correlated to long term likelihood that crystals of the DEF components may have formed within the blending chamber and/or orifice of the air inlet to the blending chamber are understood to be contemplated herein. A pressure drop in the blending chamber may be correlated to crystal formation.

The exemplary procedure includes performing the cleaning procedure by stopping the DEF stream, then stopping the air stream, then flowing an amount of DEF through the cylindrical blend chamber, then stopping the DEF stream again, then resuming the air stream, and then resuming the DEF stream. The exemplary procedure may further includes, after stopping the DEF stream, waiting a first period of time and then stopping the air stream. The exemplary procedure further includes waiting a second period of time of flowing the DEF stream without the air stream until a cleaning amount of DEF is flowed. The exemplary procedure further includes waiting a third period of time and resuming flow of the air stream. The exemplary procedure further includes waiting a fourth period of time and then resuming normal flow of the DEF stream and the air stream. In certain embodiments, the first period of time is five seconds, the second period of time is five seconds, the cleaning amount of the DEF stream is between 0.1 mL over 10 seconds and 0.1 mL per second for 10 seconds, the third period of time is 5 seconds, and the fourth period of time is 10 seconds. Any time values and flow amounts known in the art, including those determined to be effective by routing testing having the benefit of the disclosures herein, are contemplated herein.

Another exemplary procedure for providing DEF to an injection nozzle is described. The procedure includes an operation to provide a DEF to a blending chamber, an operation to provide an air stream to the blending chamber at a divergent angle relative to the DEF, and an operation to provide an effluent of the blending chamber to a nozzle fluidly coupled to an exhaust stream of an internal combustion engine. An exemplary divergent angle includes a perpendicular angle. In certain embodiments, the operation to provide the air stream includes accessing a vehicle air system. An exemplary procedure further includes an operation to provide an air stream capable of having an entrance speed to the blending chamber of at least 47 m/sec.

An exemplary procedure further an operation to transfer heat from an engine coolant stream to the DEF. In certain embodiments, the method includes performing an engine cold start and heating the DEF to an operational temperature within 40 minutes after the engine cold start.

As is evident from the figures and text presented above, a variety of embodiments according to the present invention are contemplated.

An exemplary embodiment is a system including a cylindrical blend chamber having two inlets and one outlet. The outlet is fluidly coupled to a transfer line, a first inlet is fluidly coupled to a diesel exhaust fluid (DEF) stream, and the second inlet is fluidly coupled to an air stream. The DEF is a fluid in solution including water, and further including a $NO_x$ reduction agent such as urea. The DEF stream and the air stream intersect at a 90 degree angle, and the system includes a nozzle downstream of the transfer line. The nozzle is fluidly coupled to an exhaust stream of an internal combustion engine. The system further includes the air stream terminating at the cylindrical blend chamber in an orifice having a length of at least 5 mm, or a distance from the intersection of the air stream and the DEF stream back to a non-return valve in the air stream is at least 6 mm, and the system further includes an air source that provides sufficient air flow to the air stream such that an air velocity of the air stream in the orifice is at least 47 m/sec.

An exemplary system further includes a non-return valve disposed in the air stream at a position upstream of the orifice, where the air source includes a vehicle air source and/or a dedicated air pump. An exemplary system further includes the air source being a vehicle air source, and the system further includes an air regulator disposed between the air source and the non-return valve.

An exemplary system further includes a number of seals for internal tubing connections of the air stream and a number of seals for internal tubing connections of the DEF stream. Each of the seals includes a radial and a face seal O-ring. Further, some, none, or all of the seals are doubly redundant. The exemplary system further includes a coolant cavity thermally coupled to the DEF stream. The coolant cavity receives engine coolant. The coolant cavity is formed by a housing wall, which may be welded and further may be vibrationally and/or ultrasonically welded. In certain further embodiments, the coolant cavity includes no elastomeric seal. In certain embodiments, the system includes a flexible resistive element that selectively heats the DEF stream.

The heating for the DEF stream, in certain embodiments, is capable of heating the DEF stream to an operational temperature from a cold start within 40 minutes. A cold start condition includes any cold start condition known in the art. Exemplary cold start conditions include a cold soaked engine start, an engine start wherein the ambient temperature is below a freezing temperature of the DEF, an engine start wherein the ambient temperature is below a crystallization temperature of the DEF, an engine start wherein a temperature of the DEF stream is below a freezing temperature of the DEF, and an engine start wherein a temperature of the DEF stream is below a crystallization temperature of the DEF.

In certain embodiments, an air-assisted, centerline or near-centerline injector is provided. The injector provides injected urea to the exhaust stream of the engine having a droplet characteristic that includes a Sauter Mean Diameter (SMD) less than 80 microns, an SMD between 15-30 microns, a DV90 droplet size below 260 microns, and/or a DV90 droplet size less than or equal to 80 microns.

In certain embodiments, the system includes a controller that functionally executes certain operations to clean the blending chamber. The controller determines a cleaning cycle index and, in response to the cleaning cycle index exceeding a threshold cleaning value, provides a cleaning procedure command. In certain embodiments, the controller further determines that a temperature of an exhaust stream is sufficiently high to perform the cleaning procedure. An exemplary sufficient temperature of the exhaust stream is greater than 300° C.

Exemplary cleaning cycle indices include a time since a previous cleaning cycle operation, a Δ-pressure value of the cylindrical blend chamber, an occurrence of a cleaning cycle triggering event, and an accumulating parameter value since a previous cleaning cycle operation. Exemplary cleaning cycle triggering events include a loss of air from the air source, a temperature excursion within the cylindrical blend chamber below a threshold temperature, and a service input request. Exemplary accumulating parameter values include vehicle miles driven, engine operating time, engine $NO_x$ produced, engine fuel consumed, and DEF fluid injected.

An exemplary method includes utilizing the system having the controller, and in response to the cleaning procedure command, performing, in order: stopping the DEF stream, after a first period of time stopping the air stream, after a second period of time flowing the DEF stream without the air stream until a cleaning amount of DEF is flowed, after a third period of time resuming flow of the air stream, and after a fourth period of time resuming normal flow of the DEF stream and the air stream. Another exemplary method includes, in response to the cleaning procedure command, performing, in order: stopping the DEF stream, stopping the air stream, flowing an amount of DEF through the cylindrical blend chamber, stopping the DEF stream, resuming the air stream, and resuming the DEF stream.

Another exemplary embodiment is a method for providing DEF to an exhaust stream of an internal combustion engine. The method includes determining a target dosing quantity of a DEF, determining a dosing amount of the DEF over a discrete time window in response to the target dosing quantity, and providing a binary metering valve command in response to the dosing amount over the discrete time window. The binary metering valve command includes an on-time command and an off-time command, a duty cycle, or other on-off type command where the binary metering valve is responsive to the command. The binary metering valve command is alternatively or additionally provided in response to a pressure of a DEF source, and a pressure of a mixing chamber. The mixing chamber receives DEF from the DEF supply through the metering valve and further receives air from an air source.

The exemplary method further includes reducing a size of the discrete time window at a high target dosing quantity and increasing a size of the discrete time window at a low target dosing quantity. An exemplary boundary between the high target dosing quantity and the low target dosing quantity comprises 0.1 mL/second. An exemplary increased discrete time window size is 1 second, and an exemplary reduced discrete time window size is ⅓ second.

In certain embodiments, the method includes controlling the pressure of the DEF source that is observed at an upstream side of the metering valve. The exemplary method includes determining the pressure of the mixing chamber is as a function of the pressure of the DEF source, a pressure of the air source, a pressure drop in a transfer line downstream of the mixing chamber, a pressure drop in a nozzle downstream of the transfer line, and the dosing amount. Alternatively, an exemplary method includes estimating the pressure of the mixing chamber to be a pressure of the air source.

An exemplary method further includes providing a transfer line downstream of the mixing chamber, a nozzle downstream of the transfer line, and injecting the dosing amount of the DEF through the nozzle at a centerline of an exhaust stream for an internal combustion engine. Another exemplary method includes injecting the dosing amount of the DEF through the nozzle axially into an exhaust stream for an internal combustion engine.

Yet another set of embodiments is a system including a cylindrical blend chamber having two inlets and one outlet. The outlet is fluidly coupled to a transfer line, a first one of the inlets is fluidly coupled to a diesel exhaust fluid (DEF) stream, and the second inlet is fluidly coupled to an air stream. The DEF stream and the air stream intersect at a divergent angle. An exemplary divergent angle is a perpendicular angle (i.e. 90° or a substantially similar angle). Other steep angles that still provide sufficient atomization are contemplated herein. The system includes a nozzle downstream of the transfer line, wherein the nozzle is fluidly coupled to an exhaust stream of an internal combustion engine.

In certain further embodiments the system includes the air stream terminating at the cylindrical blend chamber in an orifice having a length of at least 5 mm. The exemplary system further includes an air source capable of providing sufficient air flow to the air stream such that an air velocity of the air stream in the orifice is at least 47 m/sec. In certain embodiments, the system includes a non-return valve disposed in the air stream at a position upstream of the orifice. Additionally or alternatively, the air source may be a vehicle air source or a dedicated air pump.

An exemplary system further includes a coolant cavity thermally coupled to the DEF stream. The coolant cavity may be structured receive engine coolant. In certain embodiments, the coolant cavity is formed by a housing wall coupled to a dosing module. The coupling mechanism of the housing wall includes fasteners, a vibration weld, or an ultrasonic weld. In certain embodiments, the coupling mechanism does not include an elastomeric element positioned between the housing wall and the dosing module.

In certain embodiments, the system includes a means for heating the DEF stream to an operational temperature from a cold start within 40 minutes. The means for heating the DEF stream include, without limitation, circulating engine coolant through a chamber in thermal contact with at least a portion of the DEF stream, providing a resistive heating element in thermal contact with at least a portion of the DEF stream, and circulating engine coolant in contact with a wall of a dosing module housing, thereby heating the dosing module. In certain embodiments, a cold start indicates a condition including a cold soaked engine start, an engine start wherein the ambient temperature is below a freezing temperature of the DEF, an engine start wherein the ambient temperature is below a crystallization temperature of the DEF, an engine start wherein a temperature of the DEF stream is below a freezing temperature of the DEF, and/or an engine start wherein a temperature of the DEF stream is below a crystallization temperature of the DEF.

In certain embodiments, the system includes a means for providing the injected urea to the exhaust stream having a selected droplet characteristic. The selected droplet characteristic includes a Sauter Mean Diameter (SMD) less than 80 microns, an SMD between 15-30 microns, a DV90 droplet size below 260 microns, and/or a DV90 droplet size less than or equal to 80 microns. The means for providing the selected droplet characteristic includes, without limitation: contacting air and a DEF at a divergent angle and providing the mixed stream to an injection nozzle; contacting air traveling at a flow velocity of at least 47 m/sec and a DEF at a divergent angle and providing the mixed stream to an injection nozzle; contacting air and a DEF at a perpendicular angle and providing the mixed stream to an injection nozzle; contacting air flowing in an orifice of at least 5 mm length and a DEF at a divergent angle and providing the mixed stream to an injection nozzle; injecting a mixed DEF-air stream into an exhaust stream of an internal combustion engine at a location offset from a radial edge of the exhaust stream; injecting a mixed DEF-air stream into an exhaust stream of an internal combustion engine at a location near or at a radial center of the exhaust stream; injecting a mixed DEF-air stream into an exhaust stream of an internal combustion engine through one or more nozzle orifices facing in a downstream direction of the exhaust stream; and any combinations of the described means for providing the selected droplet characteristic.

Yet another set of embodiments is a method including providing a diesel exhaust fluid (DEF) to a blending chamber, providing an air stream to the blending chamber at a divergent angle relative to the DEF, and providing an effluent of the blending chamber to a nozzle fluidly coupled to an exhaust stream of an internal combustion engine. An exemplary divergent angle includes a perpendicular angle. In certain embodiments, providing the air stream includes accessing a vehicle air system. An exemplary method further includes providing an air stream capable of having an entrance speed to the blending chamber of at least 47 m/sec.

An exemplary method further includes transferring heat from an engine coolant stream to the DEF. In certain embodiments, the method includes performing an engine cold start and heating the DEF to an operational temperature within 40 minutes after the engine cold start.

Yet another exemplary set of embodiments include an apparatus having a cylindrical blend chamber having two inlets and one outlet, wherein the outlet is adapted to couple to a transfer line, where a first inlet is adapted to fluidly couple to a diesel exhaust fluid (DEF) stream, and where the second inlet is adapted to fluidly couple to an air stream. The apparatus further includes DEF stream inlet including an orifice having a length of at least six (5) mm. The apparatus further includes the orifice the air stream inlet entering the blending chamber at a divergent angle.

In certain embodiments, the apparatus further includes a housing defining the blend chamber, the two inlets, and the outlet, where the apparatus further includes a plate coupled to the housing and forming a coolant chamber therebetween. The coolant chamber is structured to provide thermal contact between a coolant in the coolant chamber and the DEF. In certain embodiments, the apparatus includes a plate coupled to the housing by one of an ultrasonic weld and a vibration weld.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
   a housing including a pump;
   a cylindrical blend chamber in the housing, the blend chamber having two inlets and one outlet, wherein the outlet is fluidly coupled to a transfer line, wherein a first inlet is fluidly coupled to a diesel exhaust fluid (DEF) stream and receives the DEF stream from the pump, and wherein the second inlet is fluidly coupled to an air stream downstream of the pump;
   wherein the DEF stream and the air stream intersect at a divergent angle and form a blended DEF and air stream that is provided from the blending chamber to the transfer line; and
   a nozzle downstream of the transfer line, wherein the nozzle is fluidly coupled to an exhaust stream of an internal combustion engine and the nozzle delivers the blended DEF and air stream into the exhaust stream.

2. The system of claim 1, wherein the air stream terminates at the cylindrical blend chamber in an orifice having a length of at least 5 mm, the system further comprising an air source structured to provide sufficient air flow to the air stream such that an air velocity of the air stream in the orifice is at least 47 m/sec.

3. The system of claim 1, wherein the divergent angle is a perpendicular angle.

4. The system of claim 2, further comprising a non-return valve disposed in the air stream at a position upstream of the orifice.

5. The system of claim 3, wherein the air source comprises one of a vehicle air source and a dedicated air pump.

6. The system of claim 1, wherein the housing defines a coolant cavity thermally coupled to the DEF stream and coolant in the coolant cavity heats the DEF stream.

7. The system of claim 6, wherein the coolant cavity is structured to receive engine coolant.

8. The system of claim 7, wherein the coolant cavity is formed by one of a vibration welded housing wall and an ultrasonic welded housing wall that is welded to the housing.

9. The system of claim 1, further comprising a means for heating the DEF stream to an operational temperature from a cold start within 40 minutes.

10. The system of claim 9, wherein the cold start comprises a start condition selected from the start conditions consisting of: a cold soaked engine start, an engine start wherein the ambient temperature is below a freezing temperature of the DEF, an engine start wherein the ambient temperature is below a crystallization temperature of the DEF, an engine start wherein a temperature of the DEF stream is below a freezing temperature of the DEF, and an engine start wherein a temperature of the DEF stream is below a crystallization temperature of the DEF.

11. The system of claim 1, further comprising a means for providing the blended DEF and air stream to the exhaust stream having a droplet characteristic selected from the droplet characteristics consisting of: a Sauter Mean Diameter (SMD) less than 80 microns, an SMD between 15-30 microns, a DV90 droplet size below 260 microns, and a DV90 droplet size less than or equal to 80 microns.

12. A method, comprising:
providing a diesel exhaust fluid (DEF) to a blending chamber;
providing an air stream to the blending chamber at a divergent angle relative to the DEF;
providing an effluent of the blending chamber to a nozzle, the nozzle being fluidly coupled to an exhaust stream of an internal combustion engine upstream of an aftertreatment system, wherein the nozzle provides DEF into the exhaust stream to reduce NOx from the exhaust stream with the presence of DEF over the aftertreatment system.

13. The method of claim 12, wherein the divergent angle comprises a perpendicular angle.

14. The method of claim 12, wherein the providing the air stream comprises accessing a vehicle air system.

15. The method of claim 12, wherein the providing the air stream comprises providing the air stream at an entrance speed to the blending chamber of at least 47 m/sec.

16. The method of claim 12, further comprising transferring heat from an engine coolant stream to the DEF.

17. The method of claim 12, further comprising performing an engine cold start and heating the DEF to an operational temperature within 40 minutes after the engine cold start.

18. An apparatus, comprising:
a housing including a pump to receive a diesel exhaust fluid (DEF);
a cylindrical blend chamber in the housing, the blend chamber having two inlets and one outlet, wherein the outlet is adapted to be coupled to a transfer line that exits the housing, wherein a first inlet is adapted to be fluidly coupled to a DEF stream and receive the DEF stream from the pump, and wherein a second inlet is adapted to be fluidly coupled to an air stream downstream of the pump;
a nozzle downstream of the transfer line, wherein the nozzle is configured to receive a blended DEF and air stream from the blend chamber via the transfer line; and
wherein the second inlet comprises an orifice having a length of at least five (5) mm, and wherein the orifice and the first inlet enter the blending chamber at a divergent angle to form the blended DEF and air stream in the blend chamber.

19. The apparatus of claim 18, further comprising a plate coupled to the housing and forming a coolant chamber in the housing, the coolant chamber structured to provide thermal contact between a coolant in the coolant chamber and the DEF in the housing to heat the DEF.

20. The apparatus of claim 19, wherein the plate is coupled to the housing by one of an ultrasonic weld and a vibration weld.

* * * * *

UNITED STATES PATENT AND TRADEMARK OFFICE
CERTIFICATE OF CORRECTION

| | | |
|---|---|---|
| PATENT NO. | : 8,888,017 B2 | Page 1 of 1 |
| APPLICATION NO. | : 13/243096 | |
| DATED | : November 18, 2014 | |
| INVENTOR(S) | : Chetan Pannathpur et al. | |

It is certified that error appears in the above-identified patent and that said Letters Patent is hereby corrected as shown below:

Title Page (75), inventor Eric Burmester's name is misspelled "Burmeister" and the correct spelling is --Burmester--.

Signed and Sealed this
Ninth Day of June, 2015

Michelle K. Lee
*Director of the United States Patent and Trademark Office*